United States Patent [19]
Kim

[11] Patent Number: 5,278,393
[45] Date of Patent: Jan. 11, 1994

[54] ELECTRICALLY HEATED DESOLDERING UNIT HAVING ADJUSTABLE STOP MEANS PREVENTING CIRCUIT BOARD DAMAGE FOR DESOLDERING ELECTRONIC COMPONENTS HAVING ROWS OF LEADS

[76] Inventor: Henry Kim, 9202 Kenamar Dr., Ste. #204, San Diego, Calif. 92121

[21] Appl. No.: 905,359

[22] Filed: Jun. 29, 1992

[51] Int. Cl.⁵ .................... B23K 3/00; B23K 31/02; H05B 1/00
[52] U.S. Cl. .................... 219/228; 219/221; 219/230; 228/19; 228/51; 228/180.1; 228/264
[58] Field of Search .................... 219/221, 227–242; 228/19–21, 264.191, 180.1, 180.2, 51–55

[56] References Cited

U.S. PATENT DOCUMENTS

| | | | |
|---|---|---|---|
| 3,230,338 | 1/1966 | Kawecki | 219/229 |
| 3,555,950 | 1/1971 | Gijsbers et al. | 219/229 X |
| 3,576,969 | 5/1971 | Surty et al. | 219/221 |
| 3,990,863 | 11/1976 | Palmer | 219/230 X |
| 4,238,664 | 12/1980 | Anderson | 219/230 |
| 4,528,746 | 7/1985 | Yoshimura | 228/264 X |
| 4,896,019 | 1/1990 | Hyun | 219/228 |
| 5,054,681 | 10/1991 | Kim | 228/51 |
| 5,147,081 | 9/1992 | Kim | 228/51 |

FOREIGN PATENT DOCUMENTS 121910  10/1984  European Pat. Off. .............. 228/19

Primary Examiner—Anthony Bartis
Attorney, Agent, or Firm—Ralph S. Branscomb

[57] ABSTRACT

A specialized desoldering unit head is provided for the limited purpose of removing high-density solid state electronic components from circuit boards in a single step, without damaging the circuit board. In the typical case of a four-sided component with a row of leads on each side, the unit includes an electrically heated head which fits over the component with a heat-conducting blade fitting over each of the rows on the four sides of the component. The head has depth limiters stop means formed by at least one adjustable screw threaded through at least one laterally extended cross-strap on the head and positioned to engage against the top of the component to limit the lowering of the heated blades relative to the rows of leads so that the heated blades do not touch the circuit board, or even the horizontal portion of the surface-mounted leads of the lead rows, but only mounds of solder which have been applied over the leads to facilitate their heating and the removal of the component.

2 Claims, 1 Drawing Sheet

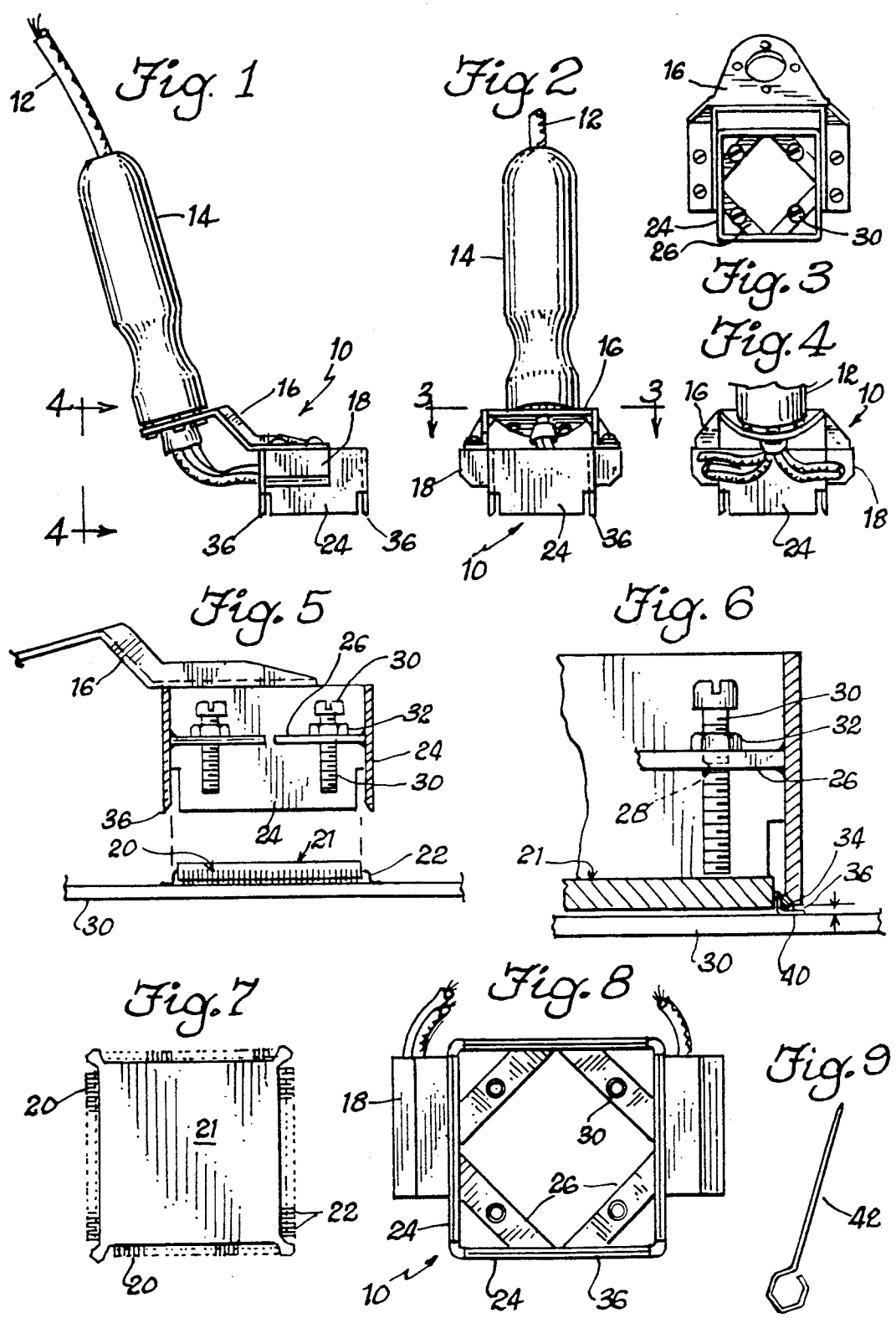

ELECTRICALLY HEATED DESOLDERING UNIT HAVING ADJUSTABLE STOP MEANS PREVENTING CIRCUIT BOARD DAMAGE FOR DESOLDERING ELECTRONIC COMPONENTS HAVING ROWS OF LEADS

BACKGROUND OF THE INVENTION

The instant invention is in the field of circuit board manufacture, and particularly addresses the need that frequently crops up to remove a component that has already been soldered to the board. This sometimes occurs because after mounting the component it is found to be faulty.

Removal of components from a circuit board for replacement was simpler in past years due to the more simplified nature of the components. For example, most components from a few years ago had two parallel rows of leads which could be removed with an elongated blade by heating one side of the component and lifting it up, and then heating the other side and removing the component.

This simple procedure is clearly no longer possible when the lead row arrangement exceeds two parallel rows and enters the realm of polygonal arrangements, such as a square with a row of surface mount leads on each side of the square. Obviously, it is impossible to heat one side and then lift it up and then heat the others.

Because of the requirement that each and every one of the very fine leads must be heated to molten solder temperature simultaneously or the component will not release, past techniques and facilitating tools have created frustration. It is very common, using current techniques, to heat almost all of the surface mount leads adequately to release them from their pads, only to have one, or a small number, of the leads still bonded to their pads so that the entire component refuses to release. Of course, it is not apparent which leads are not releasing in most cases.

Because of the above-mentioned problem, repeated application of heat is often required to remove the component. This repeated heat may damage some types of circuit boards, or closely mounted components, or possible the component that is being removed.

There is a need for a simple, virtually full-proof removal means and method for removing state-of-the-art high density flat packs having quadrilateral lead row arrangements.

SUMMARY OF THE INVENTION

The instant invention fulfills the above stated need by providing a soldering head and means for using same which is characterized by vertical depth stop means which permits the soldering head to be lowered only a limited distance onto the component. The adjustable stop means in the preferred embodiment contacts the top of the component to be removed, and to prevent the heated blades which contact the polygonally arranged lead rows from contacting the circuit board. Ordinarily the hot blades are even prevented from contacting the horizontally extended pad-mounting portion of the surface-mount leads, with the heat from the soldering head blades being conducted to the leads through a mound of solder that is applied to each of the lead rows prior to the application of the specialized head.

BRIEF DESCRIPTION OF THE DRAWINGS

FIG. 1 is a side elevation view of the invention;
FIG. 2 is a front elevation view of the invention;
FIG. 3 is a section taken along line 3—3 of FIG. 2;
FIG. 4 is a view taken along line 4—4 of FIG. 1;
FIG. 5 is a longitudinal vertical section taken through the soldering head illustrating the relationship of the stop screws and the underlying flat pack;
FIG. 6 is a detail illustrating the application of one of the four blades of the soldering head to one lead row;
FIG. 7 is a top plan view of a typical, modern flat pack having an integrally molded spacer at each corner separating the orthogonally meeting lead rows;
FIG. 8 is a bottom plan view of the head illustrating the heating elements mounted thereon, but without a flat pack component in place and with the handle structure omitted; and
FIG. 9 illustrates a wire used to pry the component from a printed circuit board.

DETAILED DESCRIPTION OF THE PREFERRED EMBODIMENT

The head of the instant invention is indicated at 10, and could be mounted on a soldering iron having an inter-changeable head structure, but would more likely be incorporated in its own soldering iron due to the relatively high heat requirements of the head. For this reason the integral soldering iron structure is shown in the drawings, and includes basic soldering iron structure such as the power cord 12, the non-heat conducting handle 14, and the mounting bracket 16 which is screwed to the tops of the heating elements 18, which are in turn brazed to the upper portions of the quadrilateral head itself. The heating elements 18 are provided on two opposite sides of the head in order to generate enough heat to melt the solder along all of the lead rows 20 of a component 21 such that all of the individual leads 22 are adequately heated, and the quadrilaterally arranged heating blades 24 have adequate heat sink support to sustain the heat transfer process.

The invention could of course be used for other electronic components rather than the square component 21 that is shown and described herein, including a single-row or double-row component, but the invention is by far most useful when applied to the quadrilateral flat pack described herein which is currently very common on the market.

With this in mind, it will be understood that the cross straps 26 brazed across the corners of the soldering heads as best seen in FIG. 3 could be differently arranged in a different shaped head, with the same effect. The cross straps 26 each define a threaded bore 28 which threadedly engages a set screw 30, with a stop nut 32 on the shaft of the screw. The stop screws are used in the overall component removal technique as follows: first, with other soldering equipment that is not shown, a mound 34 of solder is applied along each of the lead rows 20. This elongated mound of solder on each row is adequate in mass to cover each of the individual leads 22 in the row and communicate enough heat to the lead to melt the solder bonding it to the underlying pad on the circuit board.

Once the mounds have been applied to all of the lead rows, which is a very quick process, the head 10, after being brought up to temperature, is lowered onto the component as shown in FIG. 6. The stop screws 30 have been pre-set so that the lower edges 36 of the blades 24 do not contact the circuit board 38, or ordinarily not even the horizontally splayed out portion 40 of the lead. This is shown in FIG. 6.

In ordinary usage, a single component is removed at a time. In other words, one board is found to have one faulty component which is to be removed as opposed to an operator being provided with several dozen boards having identical or different components to be removed.

Thus, the operator first adjusts the stop screws 30 to the proper height for the particular component as indicated in FIG. 6, then removes the head, applies the solder mounds, and re-applies the head as shown in FIG. 6. Once the head has been applied as shown in FIG. 6, the component can be removed within about two seconds. To facilitate this, there could either be some auxiliary structure within the head, or a specialized pop-off pin 42 of FIG. 9 could be inserted under one of the corners of the component. The point is, the entire removal process for a quadrilateral component after setting the adjustable stops, which is also quick and easy to do, takes several seconds, including adding the solder to the leads to create the solder mounds. For this reason, for all parts involved, including the circuit board, the removed component and any closely adjacent components, exposure to heat is limited to an absolute minimum.

This invention is one of a series of inventions for use with soldering and de-soldering components to circuit boards, keeping up with the continuing advancement and change in the style, complexity, and sophistication of components and techniques used in modern circuit board manufacture.

It is hereby claimed:

1. A de-soldering unit for de-soldering an electronic component from a circuit board on which the electronic component has at least one elongated row of leads at least partially soldered to said circuit board, said unit comprising;
    (a) a head;
    (b) heating means to heat said head to solder melting temperature;
    (c) for each of the at least one elongated rows, said head defining an elongated blade substantially coextensive with the respective one of the at least one elongated row;
    (d) said head including a laterally extended cross-strap and further defining a stop means comprising an adjustable screw threaded through said strap and positioned to engage against the top of said electronic component to permit the lowering of said head until said blade is in thermal contact with the respective elongated row, but stopping said blade short of touching the circuit board; and,
    (e) at least one of the at least one row of leads comprising surface mount leads having a depending leg and a mounting leg extended out substantially horizontally for mounting to a solder pad, and said stop means is arranged to stop said blade substantially short of touching said mounting legs.

2. A de-soldering unit for de-soldering an electronic component from a circuit board on which the electronic component has four quadrilaterally arranged rows of leads at least partially soldered to said circuit board, said unit comprising;
    (a) a head;
    (b) heating means to heat said head to solder melting temperature;
    (c) for each of said four quadrilaterally arranged rows, said head defining an elongated blade substantially coextensive with the respective one of said rows, said blades defining a configuration to closely fit over said four quadrilaterally arranged rows;
    (d) said head including a laterally extended cross-strap; and
    (e) stop means comprising an adjustable screw threadedly engaged through said cross-strap and positioned to engage against the top of said electronic component to permit the lowering of said head until said blades are in thermal contact with said leads, but stopping said blades short of touching the circuit board.

* * * * *